Feb. 24, 1942.　　C. P. GALANOT ET AL　　2,273,949
TRACTION DEVICE FOR MOTOR VEHICLES
Filed Nov. 19, 1938　　5 Sheets-Sheet 1
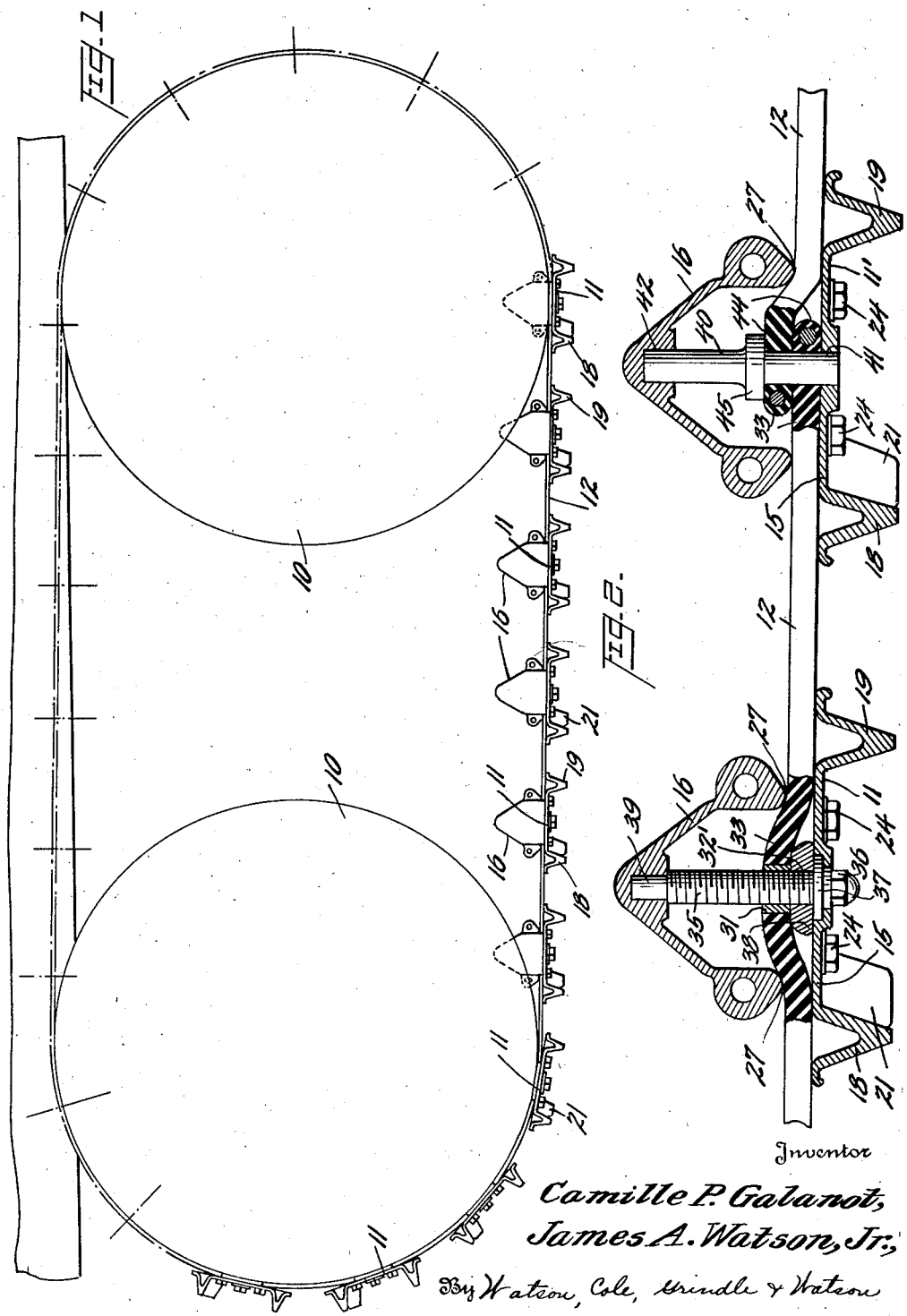
Inventor
Camille P. Galanot,
James A. Watson, Jr.,
By Watson, Cole, Grindle & Watson
Attorney

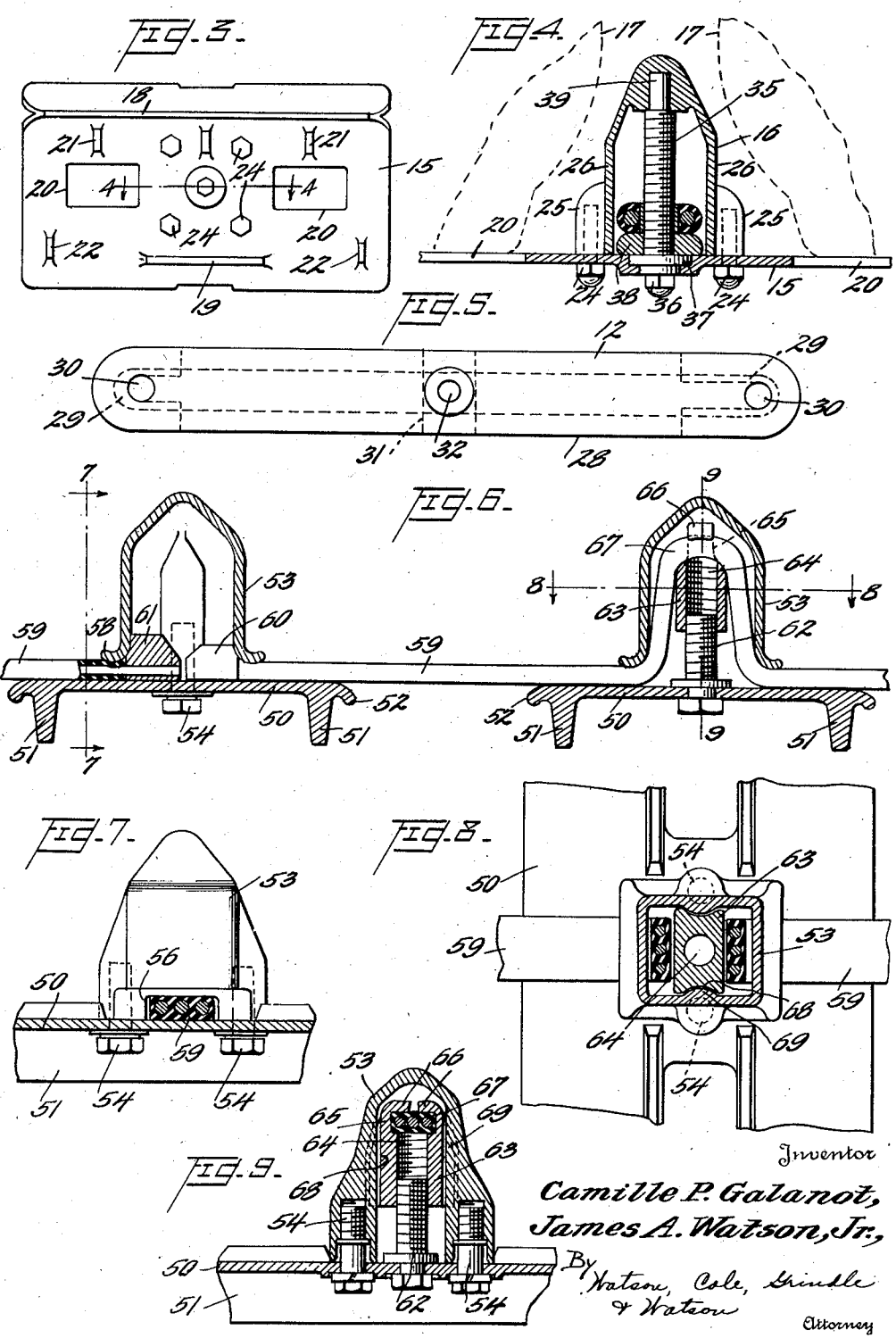

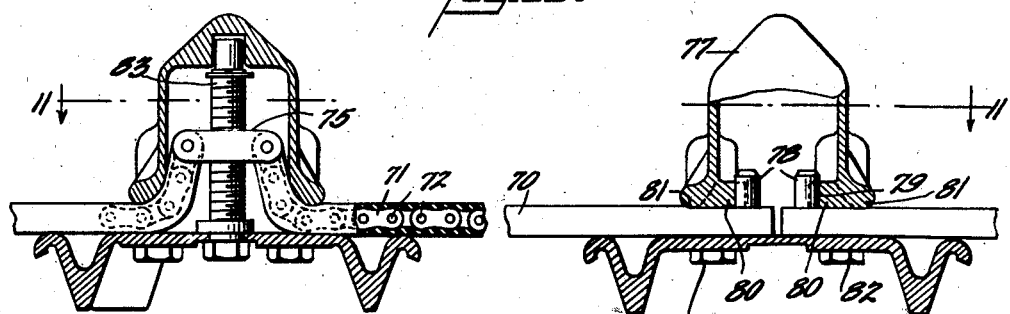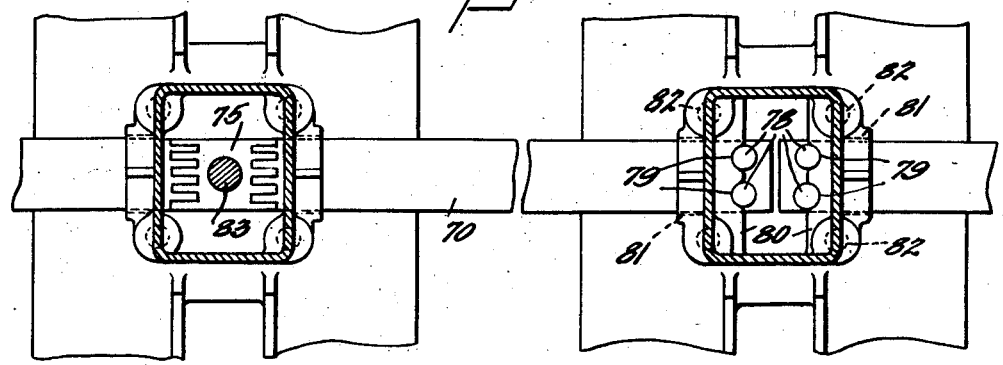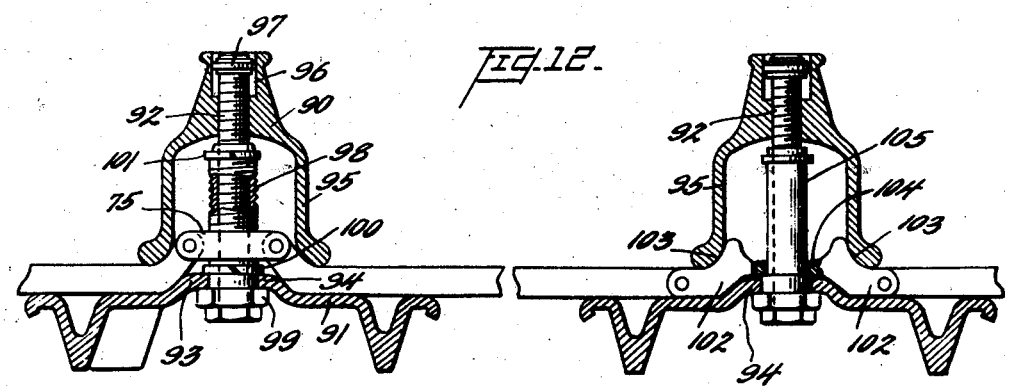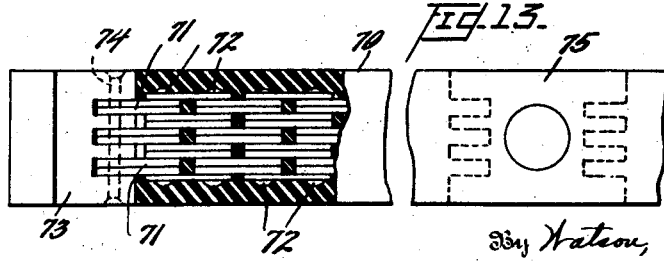

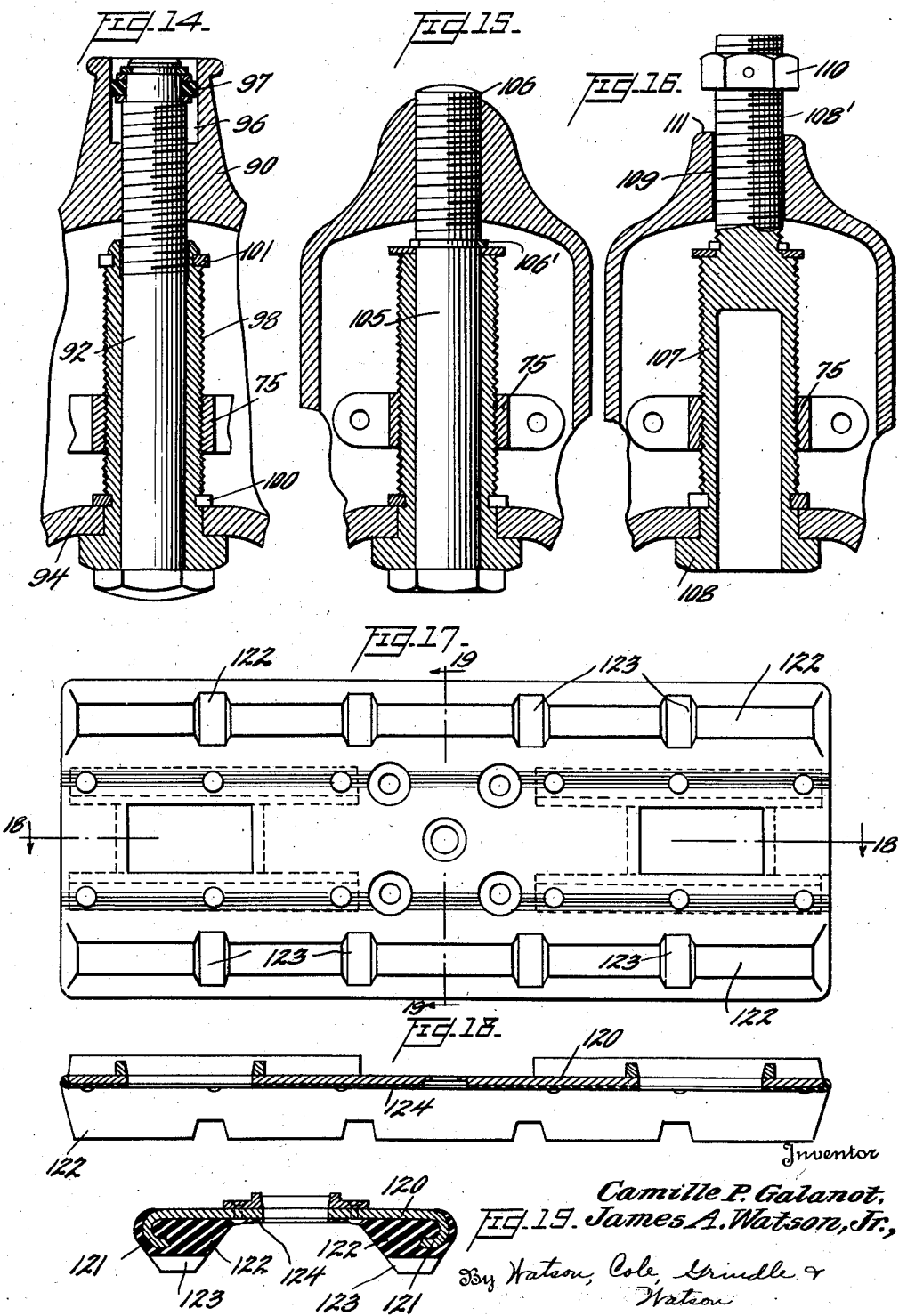

Feb. 24, 1942. C. P. GALANOT ET AL 2,273,949
TRACTION DEVICE FOR MOTOR VEHICLES
Filed Nov. 19, 1938 5 Sheets-Sheet 5
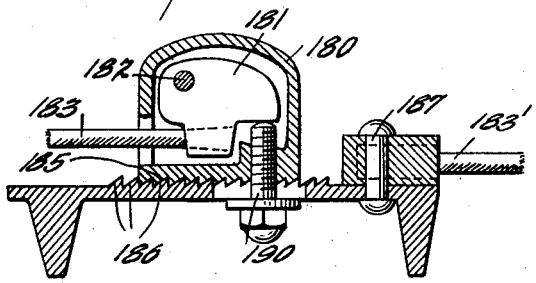
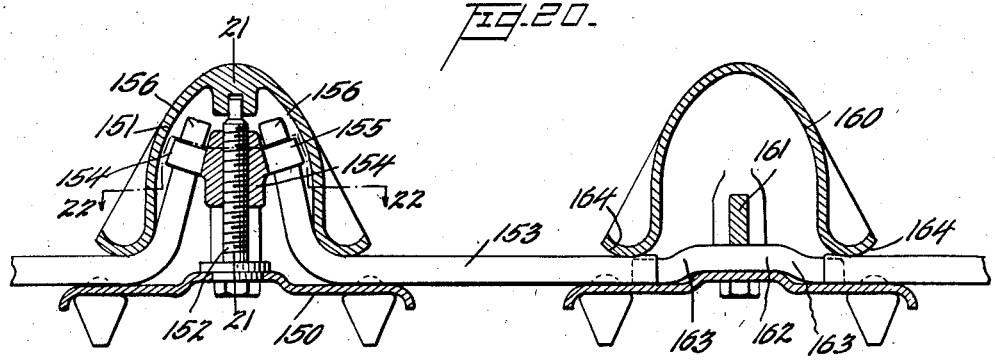
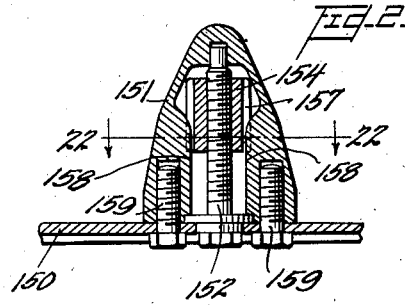
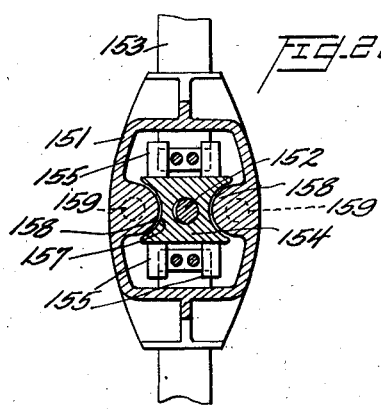
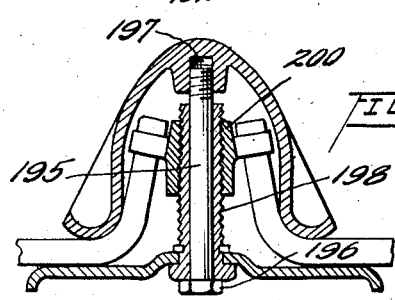
Inventor
Camille P. Galanot,
James A. Watson, Jr.,
By Watson, Cole, Grindle & Watson
Attorneys Patented Feb. 24, 1942

2,273,949

UNITED STATES PATENT OFFICE 2,273,949

TRACTION DEVICE FOR MOTOR VEHICLES

Camille P. Galanot, Cleveland, Ohio, and James A. Watson, Jr., Silver Spring, Md.

Application November 19, 1938, Serial No. 241,446

21 Claims. (Cl. 305—10)

This invention relates to traction devices and more particularly to traction devices for use in connection with vehicle wheels of the dual tire type. Such devices are intended for use to improve traction when secured directly about the periphery of a pair of dual tires or arranged as a belt travelling on tandem sets of dual tires on a bogie or truck. The devices of the present invention constitute improvements on devices of the same class disclosed in our United States Patent No. 2,171,547, patented September 5, 1939, for Traction devices.

Where it becomes important or essential to use auxiliary traction devices as accessories to dual pneumatic tired vehicles used for heavy hauling and/or towing over difficult terrain, at all seasons of the year, for improving the traction and supporting the vehicle in mud, sand and soggy ground, it is important that such accessory devices be almost universal in their adaptability. They must meet several rigid requirements. For instance they must have adequate strength without undue weight; they must be readily attachable and removable; they must store readily; they must be available for application and removal by a single man; their parts must be quickly and readily replaceable at a low cost, and above all they must be suitably adjustable to fit various sizes of wheels and tires and to permit of adjustment of the length to take care of wear in the tires or changes in the distance between the axles of the bogie.

Traction devices as disclosed in the aforementioned application comprise a plurality of spaced traction shoes connected together by intermediate flexible members into a circular series or belt for extending around a wheel or a pair of tandem spaced wheels.

An important feature of the present invention comprises the ready means for adjusting the lengths of the connecting members without removing any of the parts from the wheel or wheels whereby the belts can be tightened; to provide increased traction when the pulling is particularly hard; to take up slack resulting from wear or stretching of the belts, and tire wear which reduces the diameters of the wheels; and so that the same belt may be adapted to various diameters of tires.

In addition to the provision for adjustment for changing the lengths of the belts it is important that a plurality of adjustments be applied so spaced about the belt that the spacing of the traction shoes thereon may be made substantially uniform under any adjustment, which is highly desirable in order to maintain the proper balance of weight around the wheel and to ensure regularity in the impact of the successive traction shoes against the ground surface.

Another important feature of the invention comprises simplified methods of connecting sections of belts each mounting two or more traction shoes together to form a complete belt for use either on a single wheel or with a pair of wheels in tandem and wherein simplicity of construction and strength of connection is paramount.

As an additional feature it is contemplated to provide traction shoes having means thereon not only capable of adjusting the lengths of the belt but of connecting together two sections of the belt whereby a single shoe becomes both an adjusting member and a connecting member.

For the sake of simplicity and adjustment, a reduction in the number of parts and in the weight of the whole assembly, means is provided extending through the traction plates normal to the plane thereof and radial to the wheel and accessible on the outer surface of the plate, for making adjustments in the length of the belts and for applying the devices by connecting the belt sections together. In some cases a pair of coaxial bolts having superimposed heads serve for attaching the shoe to the belt and for adjusting the length of the belt, all adjustment being effected from the outer surface of the corresponding shoe.

The adjustment contemplated in the length of the intervening belt sections is effected solely by radial movement of portions of the belts and of the adjusting means and without any change in the relative positions of any shoe and its attached guide member which is adapted to extend into the gap between the tires of a pair to prevent lateral sliding of the shoe with respect to the tires.

All of the parts of the traction devices are so constructed that the assembly is extremely rugged and able to withstand the very severe usage to which it is subjected. Vibrations or shocks do not affect its adjustment and unusually rough rugged surfaces have but little tendency to break any of the parts which are so positioned as to be subjected to a minimum of stress.

In some cases where it may be desirable to operate vehicles both in hard going and on paved surfaces, in order to obviate the necessity of removing the belts and traction shoes to prevent damage to the roads, the traction shoes may be protected by a suitable covering of tough resilient material such as rubber which does not in the least detract from their value where the going is bad and materially softens the vibrations and reduces the noise on hard surfaced roads as well as prevents damage to the road and damage to the vehicle occasioned by shock of impact of traction shoes against the road.

The essential features of the invention may be incorporated in a number of embodiments of traction devices which vary considerably in design and in the construction and assembly of their various parts, and the accompanying drawings and following specification illustrate a number of representative embodiments by way of example only and it is to be understood that such changes, combinations and variations in the devices may be made as fall within the scope of the appended claims without departing from the spirit of the invention.

In said drawings:

Figure 1 is a side elevation of a traction device embodying features of the present invention shown as applied to tandem dual wheels of a bogie truck;

Figure 2 is a longitudinal vertical section on a larger scale through an adjacent pair of traction shoes and their connecting belt showing adjusting means and connecting means for belt sections;

Figure 3 is a view from the traction face of a shoe according to one form of the invention;

Figure 4 is a transverse central section through this shoe taken on line 4—4 of Figure 3 and showing in dotted lines portions of a pair of tires with which it cooperates;

Figure 5 is a plan view of a belt section adapted to cooperate with two connecting type traction shoes and one belt adjusting shoe;

Figure 6 is a view similar to Figure 2 but showing a further embodiment of the invention;

Figure 7 is a transverse section on line 7—7 of Figure 6;

Figure 8 is a horizontal section on line 8—8 of the right hand portion of Figure 6 showing features of the adjusting means;

Figure 9 is a transverse vertical section on line 9—9 of the right hand portion of Figure 6;

Figure 10 is a view similar to Figure 2 showing a still further embodiment of connecting and adjusting traction shoes;

Figure 11 is a horizontal section on line 11—11 of Figure 10;

Figure 12 is a view similar to Figure 2 showing a still further embodiment;

Figure 13 is a plan view, partially broken away, of a connecting belt section of the type illustrated in Figure 10;

Figure 14 is a fragmentary vertical section on a larger scale of the adjusting means applied to a shoe of the type illustrated in Figure 12;

Figure 15 is a slight modification thereof;

Figure 16 is a further modification of this construction;

Figure 17 is a traction-face view of an encased traction plate;

Figure 18 is a transverse section thereof on line 18—18 of Figure 17;

Figure 19 is a section thereof on line 19—19 of Figure 17;

Figure 20 is a longitudinal vertical section through another shoe illustrating the combination of connecting and belt adjusting means applied thereto;

Figure 21 is a section thereof on line 21—21 of Figure 20;

Figure 22 is a horizontal section taken on line 22—22 of Figure 21;

Figure 23 is a view similar to the left hand portion of Figure 20 showing a further modification; and Figure 24 is a longitudinal vertical section through a form of shoe fitted for connecting belt sections and adjusting the belt length.

Referring now to the drawings, there is disclosed in Figure 1 an arrangement of traction devices of the present invention as applied to tandem dual-tired wheels 10, the traction devices being formed into a belt encircling both wheels. The complete traction device as shown includes a plurality of spaced traction shoes 11 and connecting interposed flexible members 12 which together form a belt. This belt may be applied to pairs of wheels, as shown, or may fit closely around a single wheel if desired. For the purpose of convenience in handling and storing and for the replacing of parts, it is proposed to assemble three or four traction shoes onto a belt section and to assemble an appropriate number of these three or four shoe sections to provide the full belt of the size desired.

In most cases two distinct types of traction shoes are provided, one for positioning intermediate the ends of a flexible connecting member and provided with means to adjust the length of this member, and the other to be fitted at the end of a connecting member and having provision for attachment to the free end of an adjacent member. However, in certain cases combination connecting and adjustment traction shoes may be provided.

In Figures 2, 3, 4 and 5 is illustrated one embodiment of the invention showing the two types of traction shoes above mentioned. Referring now to Figure 2 it is seen that the flexible connecting member 12 has arranged between its ends the shoe 11 provided with adjusting means, and at its end the shoe 11' for securing the member to an adjacent one. Each shoe comprises two principal parts, a traction plate 15 and a guide portion 16 the function of which is to fit between the two tires 17 of a dual pair, as seen in transverse section in Figure 4 and to thus prevent lateral slippage of the belt assembly from the wheels.

The traction plate seen in plan from the traction side in Figure 3 may be made by casting, pressing, drop forging, or the like from suitable metal and may be provided with one or more cleats 18, 19. These may be integral or attached and of any size. As shown, 18 extends practically the full width of the plate whereas 19 is much shorter. The plate may also be provided with a pair of symmetrically spaced apertures 20 and with studs 21 and 22. These studs and apertures cooperate to increase traction. All of the traction increasing means are so disposed and shaped that there is but little tendency for mud to cling to them. The upper or tire tread engaging surface of the plate is preferably substantially flat, although it may be provided with shallow transverse ribs or the like, as seen in Figure 8, to increase the traction of the tire tread on the plate. Each plate has its maximum dimension extending transversely of the belt and wheel and is of at least the width as the the distance across the treads of the two tires.

The guide portion 16 has a dome-like or pyramidal shape being narrower transversely of the wheel, as seen in Figure 4, than circumferentially thereof, as seen in Figure 2. It is preferably hollow and may be pressed, stamped or cast with an outside configuration sized to readily fit between the side walls of the tires without seriously chafing or abrading them. In this particular embodiment these portions are adapted to be secured centrally of the rear face of the traction plate by means of four stud bolts 24 passing through the plate and received in threaded openings in lugs 25 in the side walls of the guide members. The lateral walls 26 of the guide member are thus adapted to be secured tightly against the rear face of the plate, but what may be termed the fore and aft walls are provided with shallow notches 27 to permit the connecting members 12 to pass beneath these walls. The edges of the notches are nicely rounded as shown in Figure 2 so as not to chafe the flexible connecting members and the notches are of such a depth that tightening of the holding studs 24 serves to clamp the connecting members tightly to the plate.

One form of connecting member is shown in Figure 5. It comprises a closed loop 28 of flexible steel cable having swedged into the bights at the ends thereof the metal blocks 29 perforated as at 30, and has secured at the center between the two reaches thereof the block 31 provided with threaded opening 32. The whole is covered and encased in a thick layer of rubber 33 or similar flexible, resilient, tough and water-proof material which protects the metal parts from abrasion, corrosion and the like. The device shown in Figure 5 is only sufficiently large to accommodate two traction shoes, one at one end and one intermediate the ends, but it is contemplated to provide such connecting members of suitable length to hold three or four traction shoes.

Referring again to Figure 2, the left hand portion discloses a shoe intended to adjust the length of the connecting member to which it is attached intermediate the ends, and for this purpose a threaded bolt 35 has its head 36 exposed on the traction face of the traction plate and has an enlarged flange 37 made integral with the bolt which flange takes the thrust against the plate 11. This permits rotation of the bolt in the plate. The threaded portion of the bolt is received in the threaded openings 32 and 32' in the metal block intermediate the ends of the connecting member 12 and in the part 38. This part provides a smooth surface for the connecting member and is prevented from rotation because its non-circular shape cooperates with the inner walls of the guide member. By rotation of the bolt by application of a suitable tool to its head 36 which is available on the outside of the traction plate a bight of connecting member of more or less depth can be formed within the guide member 16 to thus adjust the length of the connecting member in accordance with requirements such as variations in tire diameter, spacing of wheels, etc. The upper end of the bolt has a reduced portion 39 which is guided in a suitable aperture in the thicker head of the dome. It is preferable that the notches 27 are of such a depth that their upper edges pinch the flexible connecting member when the guide member is bolted down tightly. Therefore the studs 24 should be loosened before attempting an adjustment. When the adjustment is completed the tightening of the studs serves to relieve a considerable portion of the strain on the adjusting member which extends normal to the plate and radial to any wheel on which the plate is mounted.

The right hand shoe in Figure 2 may be termed a connector, for its purpose, in addition to the tractive effort which it exerts, is to connect together the ends of two sections 12 of the flexible belt. For this purpose there is provided a pin 40, also radially disposed, which passes through an opening 41 in the traction plate and fits within an opening 42 in the dome of the guide member. This pin has its lower diameter suitable to closely engage the walls of the apertures 30 in the two overlapped ends 44 of the connecting members. The intermediate head portion 45 on the pin holds these end members in closely overlapping relation when the stud bolts are clamped down to press the pin into the opening in the plate. Here again the clamping of the connecting members against the rear face of the plate relieves some of the strain on the connecting ends and the pin 40.

The device just described has several important features. From the traction standpoint it lays a track ahead of the wheels, places the traction shoes down gently instead of throwing them against the surface and thus lengthens their life and the life of the vehicle. The molded rubber covered connecting elements are flat and flexible and provide pivoting action for the shoes without the use of exposed pins or links. The flexibility of the belt permits lateral twist which gives maximum traction and smooth running over rough terrain. From the standpoint of constructional features it is to be noted that the adjusting screw is a unit with the shoe, that there are no loose pieces to lose, that there are no loose or exposed pins, bushings or connecting links to wear, and that adjustment is readily made from the outside with a standard wrench. In the most customary size there is approximately 3" of adjustment in each adjustable shoe. When disassembled into sections small enough for one man to store or move easily there are no loose small parts.

In Figures 6, 7, 8 and 9 is shown a further embodiment of the invention, the combination being the same as in the previous embodiment but the details of the structural elements being somewhat different. In this case a slightly different traction plate 50 is shown, having the solid cleats 51 and rounded transverse edges 52. The shape of the guide member 53 is slightly different, as shown, and it is held in position by only two securing studs 54 one on either side of the flexible connecting belt. Figure 7 clearly shows the notch 56 for this belt and it is evident that the notch is formed by turning up the end 58 of the metal which is sheared at the side. This forms a smooth rounded area for engaging and clamping the belt sections when the studs 54 are tightened as can be seen at the left of Figure 6.

The connecting belt sections 59 may be constructed somewhat as shown in Figure 5 but instead of the perforated connecting parts the end members are blocks of metal 60 and 61 as seen at the left in Figure 6. These are drilled longitudinally to receive the ends of the metal cables which are swedged therein. Each block, in the direction of the cable length, is approximately one-half of the length of the interior of the guide member 53, and radially of the wheel the blocks are much thicker than the depths of the notches so that when two of them are abutted and the guide member placed in position and bolted down, the ends of the flexible members are joined together by this guide portion.

As in the previous embodiment it is intended to mount one shoe at the end of each belt section and one or more intermediate the ends and to leave each belt section with a free end to be connected, when the whole is assembled into a complete belt, by attachment to the end shoe of the adjacent section. In the present embodiment one of the end blocks, 60, is of less radial depth than the other, 61, so that by loosening the stud bolts 54 only part way the block 60 can be withdrawn without releasing the block 61, thus simplifying the operation of assembly and removal of the belt from the wheels.

At the right of Figure 6 and in Figures 8 and 9 is shown the manner of attaining adjustment in this construction. Here again the central adjusting bolt 62 is arranged almost exactly as in the first embodiment but there is attached intermediate the ends of the connecting member 59 the block 63 centrally threaded as at 64 for a portion of its radial length and having a saddle 65 with the overlapping arms 66 for clamping the flexible member 59 securely thereto. When this block is adjusted up and down on the screw 62 it pulls the bight 67 into longer or shorter sizes and provides the adjustment. The block 63 is prevented from rotating when the bolt is turned by having its grooved sides 68 running on the raised ways 69 provided integral with the inner walls of the guide portion.

In Figures 10 and 11 the construction of the traction shoes including the plate and the guide portion is not materially different from the previous embodiments but a special form of connecting element 70 is provided which is shown in plan with the casing partly broken away in Figure 13. It comprises a multiple flat link chain formed from a plurality of flat plate-like link members 71 connected together by suitable hinge pins 72 extending transversely thereof. The width may be varied in accordance with the number of plates arranged side by side and interleaved as shown. End blocks 73 may be pivoted thereto in the manner of a hinge by pins 74 and the intermediate block 75 may be similarly attached thereto. It is desirable to cover the whole assembly or at least the link portions with a heavy covering of rubber or like material 76 which effectively prevents the entrance of sand and grit to the pivot pins and protects the whole flexible assembly from air, moisture, etc. If the rubber used is of the so-called "tread" type, the life of these flexible members is extremely long because of the absence of any abrasive material at the rubbing points. The chains can be made as strong and as flexible as necessary. The end blocks 73 may be provided with various forms of projections to enable them to be secured in position adjacent each other by the guide portion 77. For instance, in Figures 10 and 11 each is equipped with a pair of pins 78, extending radially of the wheel and normal to the plane of the grouser plate, which are received in notches 79 in the flanges 80 forming the bottoms of the larger notches 81 accommodating the flexible member or its end portion in the front and rear walls of the guide member. If desired, one set of pins may be made longer than the other so that only one end portion is released when the four securing studs 82 are retracted sufficiently to permit suitable separation of the plate and its guide portion.

The intermediate block 75 in the flexible connecting member is internally threaded and is adapted to be received over a radially extending bolt 83 mounted in the manner of the one shown in the first embodiment whereby rotation of this bolt raises and lowers the block 75 and shortens or lengthens the connecting flexible member.

In Figure 12 is shown a simple manner of attaching the guide member 90 to the traction plate 91. In this case a single central bolt 92 passes loosely through the traction plate and has its upper threaded end engaged in a suitable threaded opening in the dome-shaped top portion of the guide member. The central portion of the traction plate surrounding the bolt 92 is depressed as at 93 to provide protuberance 94, on the back face, of non-circular form which cooperates with the lower edges of the walls 95 of the guide member to prevent its rotation in respect to the plate. Where the bolt 92 passes through the upper end of the guide member there is preferably a counterbore 96. A packing washer 97 which is secured on the end of the screw closely fits the walls of the counterbore to prevent the entrance of grit and mud.

For the purpose of adjusting the connecting members a hollow threaded sleeve 98 surrounds the lower portion of the bolt 92 and has its head 99 beneath and of a larger diameter than the bolt head. The bolt and sleeve assembly is prevented from movement longitudinally by the snap ring 100 secured to the sleeve and bearing on the inner face of the plate. In this construction the adjustment and the securing of the guide portion to the plate is effected centrally of the outer face of the plate and there are no separate parts such as the stud bolts in the previous construction. Movement of the block 75 on the sleeve is limited by washer 101.

As shown to the right of Figure 12, the end members 102 of the flexible connectors are offset to fit over the raised surface 94 and to hook under the edges 103 at the bottoms of the large notches of the guide member. If desired, one of these end members may be equipped with a ring 104 which fits over the unthreaded sleeve 105 fixed over the central bolt 92 in the same manner as the adjustable threaded sleeve of the left hand part of the figure. Loosening of the central bolt will permit the portion 102 to be separated from the shoe while the ring retains the other end portion in position.

In Figure 14 there is shown, on a larger scale, the adjustment and attaching features of the left hand portion of Figure 12 where the same reference characters are applied.

In Figure 15 is shown a further embodiment. In this construction the counterbored portion of the guide portion is omitted and the central bolt 105 is of sufficient length to come just flush at 106 with the upper end of the guide member. In this construction the washer 106' maintains the bolt and sleeve assembled at all times.

In Figure 16 is shown still another embodiment in which the adjusting sleeve 107 has its head 108 available from the outside of the traction plate for adjustment of the belt length, while the solid threaded extension 108' on the opposite end thereof passes loosely through the opening 109 in the dome of the guide portion. The guide is then secured in position by tightening the nut 110 down against the upper end 111 thereof. This locking of the guide member is effected from within the belt. It is to be noted that this type is not the most desirable since it is impossible to conveniently lock nut 110 when the device is applied around one dual wheel, but this type may be used satisfactorily in a belt over dual wheels in tandem.

In Figures 17, 18 and 19 there is shown a modification of the traction plate intended primarily for use where vehicles must be provided with maximum traction and yet must often run on hard surfaced roads. In construction operations this is often the case, vehicles hauling dirt and the like being compelled to crawl up out of excavations and then haul the material away over hard surfaced roads where metal traction plates might be prohibited by law. To overcome the difficulty of having to remove the traction devices when the vehicle reaches a surfaced road it is proposed with this embodiment of the invention to shoe the plates with a heavy coating of rubber or like resilient, flexible, tough and waterproof material. As shown, the plate may comprise a stamping 120 with the long edges curled as at 121 to provide adequate anchorage for the transverse ribs 122 of rubber or the like material molded over these curved portions as shown. The ribs may be intermittently interrupted as at 123 by fore and aft notches. The intermediate portion of the plate between the ribs may have a light coating 124 of the same material as might even the back for protective purposes if desired.

Various other changes might be made in this covered plate which can be incorporated with any of the forms of adjustment means and guide portions.

In Figures 20, 21 and 22 there is disclosed a combination connecting and adjusting shoe which may have any form of plate 150 and style of guide portion 151. Its central bolt 152 is adapted to provide adjustment for the length of the connecting member 153 of any desired form. For this purpose a nut 154 is arranged to travel along the bolt as it is rotated and this nut has secured to it the splayed forks 155 serving to connect the end sections 156 of the flexible member 153 thereto. The ends are wider than the space between the tines of the fork so that they cannot pull out. The nut is prevented from rotation as shown in Figure 22 by having its grooves 157 running over the guide ways 158 formed integral with the walls of the guide portion 151 which in this construction is shown as attached to the plate by a pair of studs 159 as shown in Figure 21.

The intermediate traction shoes such as shown to the right of Figure 20 need not provide adjustment for the connecting members unless it is considered desirable to have additional adjustment above that provided by the combined adjusting and connecting shoe shown at the left of that figure. Where no adjustment is provided, the guide member 160 may have a transverse bar 161 formed integral therewith which bears on the surface of or fits into a depression in the metal block 162 secured intermediate the ends of the flexible connecting member and offset as at 163 to fit over the depressed portion in the center of the traction plate. This construction combined with the bearing of the semi-cylindrical edges 164 of the notches on the surfaces of the flexible portions of the connecting member prevents any longitudinal slippage of the shoe along the belt. The guide member is attached to the traction plate by two studs as shown.

In Figure 23 is shown a further modification which represents a variation of the left hand portion of Figure 20. In order to eliminate the additional bolts used to secure the guide member to the traction plate, this form makes use of a central bolt 195 having the head 196 on the outside of the traction plate. The opposite end of the bolt takes into the threaded opening 197 in the top of the guide member. This bolt is surrounded by a threaded sleeve 198 having a larger head 199 beneath the head 196. On this sleeve is threaded the adjusting member 200 to which is attached the belt ends. Clamping and adjustment is effected as in the case of Figures 14 and 15.

Figure 24 shows a further modified form of the invention in which the guide member 180 is hollow to provide a recess for a rocking member or lever 181 pivoted at 182 to a bolt secured in the guide member. The end of any suitable flexible connecting member 183 is secured to the rocking member 181, as shown, below the pivot. The undersurface of the guide member is provided with transverse ratchet teeth 185 which cooperate with similar teeth 186, on the upper face of the traction plate. The traction plate has secured thereto as by the rivet 187 the end 183' of a flexible connecting section extending from the lever on the next guide member.

An attaching bolt 190 passes loosely through a slot in the traction plate, engages in a threaded opening in the bottom wall of the guide member and has its end contacting with a portion of the lever 181 remote from the pivotal axis. With this construction, adjustment to tighten the belt is made by sliding the ratchet teeth over each other by hand as far as possible. When the bolt is run into position to lock the guide member to the traction plate, its point engages the rocking lever and before the two toothed parts are securely locked together a considerable additional tension is supplied to the flexible connecting member or belt by the rocking of the lever, thus ensuring a tight fit without laborious operations. In this construction it will be noted that the operation of a single radial bolt serves to connect the guide member to the traction plate and to simultaneously effect a rocking of the lever and tightening of the belt.

Having thus described the invention, what is claimed as new and desired to be secured by Letters Patent is:

1. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least one shoe intermediate its ends, and means to house an adjustable length of said member within the guide portion thereof.

2. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least one shoe intermediate its ends, and means to form a bight of said member within the guide portion thereof to shorten said member.

3. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least one shoe intermediate its ends, and means within the guide member thereon for adjustment radially of the wheel to change the length of the connecting member.

4. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least two shoes, said members being connected together within the guide portions of certain of said shoes and means within the guide portions of other of said shoes to form bights in the connecting members.

5. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least two shoes, said members being connected together within the guide portions of certain of said shoes and means within the guide portions of other of said shoes to form bights in the connecting members and means movable radially of the wheel to adjust the radial depth of said bight.

6. A traction device for attachment to a vehicle wheel of the dual tire type, said device comprising a belt composed of a series of spaced traction shoes each having a plate portion and a hollow central guide portion to fit between said tires, and a series of flexible connecting members each mounting at least two shoes, said members being connected together within the guide portions of certain of said shoes, means within the guide portions of other of said shoes to form bights in the connecting members, and means movable radially of the wheel to adjust the radial depth of said bight, said means cooperating with a screw accessible from the outside of said plate for effecting said adjustment.

7. A traction shoe for use with a traction device for attachment to a vehicle wheel, said shoe comprising a generally flat traction plate and a hollow guide portion, means securing said portion in a fixed position on the rear face of said plate, there being a passage under the front and rear walls of said portion to accommodate a flexible connecting member along the back face of said plate, a screw mounted for rotation only in said plate and adapted to adjust the length of said member received in said portion between said passages.

8. A traction shoe of the type described, comprising in combination, a generally flat plate having traction cleats on one side thereof, a hollow dome-like guide portion, a bolt passing through said plate and securing said portion to said plate, opposite walls of said portion being provided with shallow notches at the plate end to permit passage of a flexible connecting member between the plate and portion.

9. A traction shoe of the type described, comprising in combination, a generally flat plate having traction cleats on one side thereof, a hollow dome-like guide portion, means securing said portion to said plate, opposite walls of the said portion being provided with shallow notches at the plate end to admit end portions of flexible connecting members and means to associate said ends within said portion to connect adjacent members together and to said shoe.

10. A traction shoe of the type described, comprising in combination, a generally flat plate having traction elements on one side thereof, a hollow dome-like guide portion mounted on said plate, opposite walls of said portion being notched at the plate end to permit passage of a flexible connecting member between the plate and portion, a bolt loosely extending through said plate centrally of said portion and threadedly engaging therewith near the peak of the dome to secure said portion to the plate, said bolt being positioned to pass through any flexible connecting members extending through said notches.

11. A traction shoe of the type described, comprising in combination, a generally flat plate having traction elements on one side thereof, a hollow dome-like guide portion mounted on said plate, opposite walls of said portion being notched at the plate end to permit passage of a flexible connecting member between the plate and portion, a bolt loosely extending through said plate centrally of said portion and threadedly engaging therewith near the peak of the dome to secure said portion to the plate, said bolt being positioned to pass through any flexible connecting members extending through said notches, and a threaded sleeve surrounding said bolt to cooperate with and adjust the connecting member.

12. A traction device for attachment to a motor vehicle wheel comprising a series of spaced traction shoes each having a plate portion and a series of flexible connecting members extending between said shoes, means on the plate of at least one shoe to connect together and adjust the lengths of two of said members, said means extending radially of said wheel and providing only radial adjustment of the said members.

13. A traction device for attachment to a vehicle wheel comprising a plurality of spaced traction shoes, a series of connecting members alternating therewith, and means for tightening the device upon a wheel, said means including a radially disposed screw bolt and an element pivotally mounted on the shoe upon which the bolt acts, the end of a connecting member being attached to said element.

14. A traction device for attachment to vehicle wheels of the resilient tire type, said device comprising a series of spaced traction shoes each having a plate portion and a hollow guide portion, said traction shoes being adapted to make frictional driving engagement with said resilient tires, flexible, substantially non-stretchable means connecting said shoes into a continuous, chain-like structure, and means for distorting said connecting means to shorten said structure, said last means comprising a manually operable member adapted to deflect a portion of said connecting means into said hollow guide portion to form a bight.

15. A traction device for attachment to a vehicle wheel having a resilient tire, said device comprising a plurality of sections adapted to be detachably secured end to end to form a continuous chain-like structure, each said section comprising a flexible connecting member and one or more traction shoes carried thereon, each said traction shoe having a plate portion adapted to make frictional driving engagement with said resilient tire, and a guide portion, at least one traction shoe of each section being positioned intermediate the ends thereof.

16. A traction device for attachment to a vehicle wheel having a resilient tire, said device comprising a plurality of sections adapted to be detachably secured end to end to form a continuous chain-like structure, each said section comprising a flexible connecting member and at least two traction shoes carried thereon, one of which contains connecting means for an adjacent section, each said traction shoe having a plate portion adapted to make frictional driving engagement with said resilient tire, and a guide portion.

17. A traction device for attachment to a vehicle wheel having a resilient tire, said device comprising a plurality of sections adapted to be detachably secured end to end to form a continuous chain-like structure, each said section comprising a flexible connecting member and at least two traction shoes carried thereon, one of which contains connecting means for an adjacent section, and one of which contains means for adjusting the length of the flexible connecting member, each said traction shoe having a plate portion adapted to make frictional driving engagement with said resilient tire, and a guide portion.

18. A traction device for attachment to a vehicle wheel having a resilient tire, said device comprising a plurality of sections adapted to be detachably secured end to end to form a continuous chain-like structure, each said section comprising a flexible connecting member and one or more traction shoes carried thereon, each said traction shoe having a plate portion adapted to make frictional driving engagement with said resilient tire, and a guide portion, at least one traction shoe of each section being positioned intermediate the ends thereof and containing means for adjusting the length of the flexible connecting member.

19. A traction device for attachment to a vehicle wheel having a resilient tire, said device comprising a plurality of sections adapted to be detachably secured end to end to form a continuous chain-like structure, each said section comprising a flexible connecting member and one or more traction shoes carried thereon, each said traction shoe having a plate portion adapted to make frictional driving engagement with said resilient tire, and a guide portion, at least one traction shoe of each section being positioned intermediate the ends thereof and containing means adapted for movement normal to the plane of said shoe for adjusting the length of the flexible connecting member.

20. A traction device for attachment to a vehicle wheel having a resilient tire, said device comprising a plurality of sections adapted to be detachably secured end to end to form a continuous chain-like structure, each said section comprising a flexible connecting member and one or more traction shoes carried thereon, each said traction shoe having a plate portion adapted to make frictional driving engagement with said resilient tire, and a guide portion, at least one traction shoe of each section being positioned intermediate the ends thereof, each said connecting member comprising a substantially non-stretchable element, attaching members secured to the ends thereof, and a layer of flexible, resilient waterproof material encasing and protecting the assembly.

21. A traction device for attachment to a vehicle wheel having a resilient tire, said device comprising a plurality of sections adapted to be detachably secured end to end to form a continuous chain-like structure, each said section comprising a flexible connecting member and one or more traction shoes carried thereon, each said traction shoe having a plate portion adapted to make frictional driving engagement with said resilient tire, and a guide portion, at least one traction shoe of each section being positioned intermediate the ends thereof, the traction face of each said plate portion being encased in a tough, flexible, resilient, waterproof covering of sufficient thickness to provide cushioning of the plate on a road surface.

CAMILLE P. GALANOT.
JAMES A. WATSON, JR.